(12) United States Patent
Roman et al.

(10) Patent No.: US 8,840,982 B2
(45) Date of Patent: Sep. 23, 2014

(54) TEXTURED SUBSTRATE PROVIDED WITH A STACK HAVING THERMAL PROPERTIES

(75) Inventors: Paul Roman, Helchteren (BE); Rino Messere, Modave (BE)

(73) Assignee: Saint-Gobain Glass France, Courbevoie (FR)

( * ) Notice: Subject to any disclaimer, the term of this patent is extended or adjusted under 35 U.S.C. 154(b) by 863 days.

(21) Appl. No.: 12/918,892

(22) PCT Filed: Feb. 27, 2009

(86) PCT No.: PCT/FR2009/050323
§ 371 (c)(1),
(2), (4) Date: Jan. 31, 2011

(87) PCT Pub. No.: WO2009/112780
PCT Pub. Date: Sep. 17, 2009

(65) Prior Publication Data
US 2011/0135880 A1    Jun. 9, 2011

(30) Foreign Application Priority Data

Feb. 29, 2008 (FR) ..................................... 08 51321

(51) Int. Cl.
| | | |
|---|---|---|
| *B32B 3/00* | (2006.01) | |
| *B32B 17/06* | (2006.01) | |
| *C03C 17/36* | (2006.01) | |
| *G02B 5/28* | (2006.01) | |

(52) U.S. Cl.
CPC .................. *C03C 17/36* (2013.01); *G02B 5/281* (2013.01); *C03C 17/3644* (2013.01); *C03C 17/366* (2013.01); *C03C 17/3684* (2013.01); *C03C 2204/08* (2013.01); *C03C 17/3649* (2013.01); *C03C 17/3652* (2013.01); *C03C 17/3626* (2013.01); *C03C 17/3681* (2013.01)
USPC ........................... 428/172; 428/156; 428/426

(58) Field of Classification Search
USPC ......... 428/156, 167, 173, 426, 432, 433, 141, 428/161, 163, 164, 698, 172
See application file for complete search history.

(56) References Cited

U.S. PATENT DOCUMENTS

| | | | |
|---|---|---|---|
| 4,773,717 | A | 9/1988 | Pai et al. |
| 5,376,455 | A | 12/1994 | Hartig et al. |
| 7,719,752 | B2 * | 5/2010 | Sampsell et al. ............... 359/290 |

FOREIGN PATENT DOCUMENTS

| | | |
|---|---|---|
| EP | 0 404 282 A1 | 12/1990 |
| EP | 0 598 660 A1 | 5/1994 |
| EP | 0 629 592 A1 | 12/1994 |
| EP | 0 718 250 A2 | 6/1996 |
| FR | 2 898 123 | 9/2007 |

OTHER PUBLICATIONS

International Search Report issued Sep. 4, 2009 in PCT/FR2009/050323 filed Feb. 27, 2009 (with Translation of Category of Cited Documents).

* cited by examiner

*Primary Examiner* — Catherine A Simone
(74) *Attorney, Agent, or Firm* — Oblon, Spivak, McClelland, Maier & Neustadt, L.L.P.

(57) ABSTRACT

The invention relates to a glass substrate (10) having a main face that exhibits a texture in relief having a depth of at least 1 mm, characterized in that said main face (11) is provided with a thin-film stack (100) having reflection properties in the infrared and/or in solar radiation.

17 Claims, 4 Drawing Sheets

TEXTURED SUBSTRATE PROVIDED WITH A STACK HAVING THERMAL PROPERTIES

CROSS REFERENCE TO RELATED APPLICATION

This application is a U.S. National Stage Application of PCT/FR2009/050323, filed on Feb. 27, 2009, the text of which is incorporated by reference, and claims priority to French Application No. 0851321, filed on Feb. 29, 2008, the text of which is also incorporated by reference.

BACKGROUND OF THE INVENTION

1. Field of the Invention

The invention relates to a transparent substrate made of a rigid mineral material such as glass, this substrate having a main face that exhibits a texture in relief having a depth of at least 1 mm.

Such substrates are used in architectural applications for interior and/or exterior decoration.

The invention relates more particularly to the use of such substrates for manufacturing thermal insulation and/or solar protection glazing units. These glazing units may be intended for equipping buildings, especially with a view to reducing air-conditioning load and/or preventing excessive overheating (glazing called "solar control" glazing) and/or reducing the amount of energy dissipated to the outside (glazing called "low-E or "low-emissivity" glazing), brought about by the ever increasing use of glazed surfaces in buildings.

These glazing units may also be integrated into glazing units having particular functionalities, such as, for example, heating glazing or electrochromic glazing.

2. Description of Related Art

One type of stack of thin films known for giving substrates such properties consists of a metallic functional layer having reflection properties in the infrared and/or in solar radiation, especially a metallic functional layer based on silver or on a metal alloy containing silver.

These stacks of thin films are deposited industrially on vacuum deposition lines, in particular using sputtering technology, optionally enhanced by a magnetic field, known as "magnetron" sputtering.

A person skilled in the art has always considered, until now, that thin-film stacks having reflection properties in the infrared and/or in solar radiation could only be deposited onto smooth surfaces.

By "smooth surface", a person skilled in the art understands that the surface may have a roughness, especially an RMS roughness, of the order of magnitude of the physical thickness of the layers.

However, a person skilled in the art has always considered that the thin-film stacks having reflection properties in the infrared and/or in solar radiation could not be deposited onto textured surfaces and in particular onto a main face of a substrate exhibiting a texture in relief having a depth of at least 1 mm or more.

BRIEF SUMMARY OF THE INVENTION

The present invention thus relates, in its broadest sense, to a glass substrate according to claim 1. This substrate has a main face that exhibits a texture in relief having a depth of at least 1 mm and said main face is provided with a thin-film stack having reflection properties in the infrared and/or in solar radiation.

DETAILED DESCRIPTION OF THE INVENTION

Figure 1:
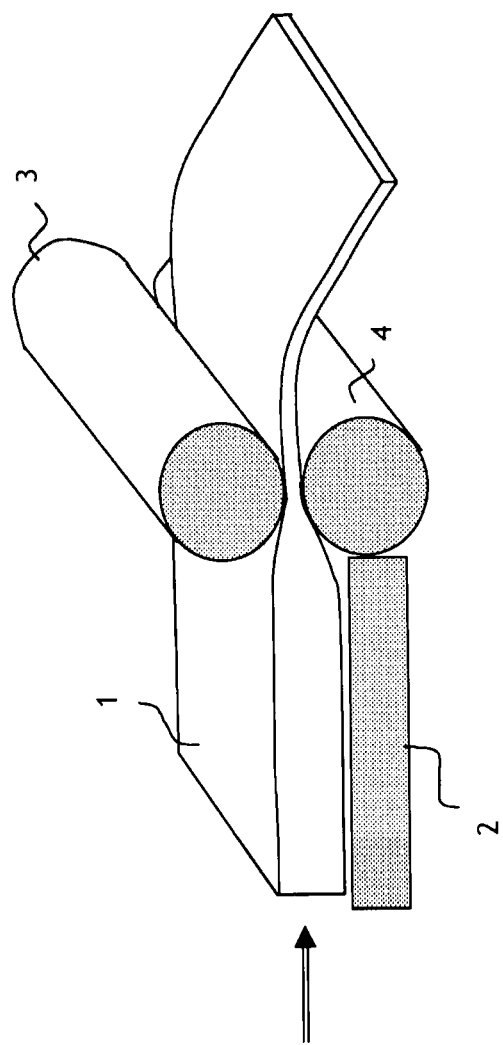
FIG. 1 schematically illustrates a rolling process in which rolling rolls are used that also act as texturing means, in the sense of the present invention.

Customarily, a thin-film stack having reflection properties in the infrared and/or in solar radiation has a total physical thickness of around 50 to 200 nm. In the context of the present invention, the depth of the relief, that is to say the difference between the highest point and the lowest point, is thus at least 5 times, and in general around 10 to 20 times, greater than the physical thickness of the stack.

The substrate may be, before and/or after the deposition of the thin-film stack, transparent with a high light transmission in the visible range (greater than or equal to 80%), or partially transparent with a mediocre light transmission in the visible range (between 20% and 80%), not very transparent with a poor light transmission in the visible range (between 5% and 20%), or even non-transparent, with a light transmission in the visible range of less than 5% (the light transmission in the visible range considered in the present document, just like the light reflection in the visible range, is that measured as usual at 550 nm).

The relief of the main face of the substrate preferably has a depth between 1 and 15 mm inclusive of these values, especially between 2 and 12 mm inclusive of these values, or even between 3 and 10 mm inclusive of these values.

Preferably, at least 20%, or even at least 50%, of the reference surface of the main face is located in one and the same plane, this plane preferably being flat, but which may optionally be curved after the deposition of thin films.

Furthermore, at least 20%, or even at least 50%, of the bottom (hollowed or protruding) surface of the relief of the main face which is not the reference surface is, preferably, located in one and the same plane, this plane preferably being flat, but which may optionally be curved after the deposition of thin films.

Moreover, the slope of the relief located between a reference surface of the main face and a bottom surface of the relief is preferably oriented at an angle α between 90° and 120°.

A thin-film stack having reflection properties in the infrared and/or in solar radiation generally has the effect of:
 decreasing the light transmission, in the visible range, of the substrate on which it is deposited by at least 10%;
 increasing the light reflection, in the visible range, of the substrate on which it is deposited by at least 10%;
 increasing the energy reflection, in the near infrared (solar control stack) or far infrared (low-emissivity stack) ranges, of the substrate on which it is deposited by at least 10%.

The substrate according to the invention thus has, preferably:

a light transmission in the visible range below 80%, or even below 60%, due to the fact that the texture also participates in decreasing this light transmission;

a light reflection in the visible range of at least 20%, or of at least 30% or 50%, or even of at least 80%, or even 90%;

an energy reflection in the infrared range of at least 10% or of at least 20%, or of at least 30% or 50%, or even of at least 80%.

An example of solar-protection glazing for buildings is given in Patents EP-0 511 901 and EP-0 678 483: these refer to functional layers for filtering out solar radiation which are made of a nickel-chromium alloy, optionally nitrided, made of stainless steel or of tantalum and which are placed between two dielectric layers of metal oxide such as $SnO_2$, $TiO_2$ or $Ta_2O_5$. This glazing makes for good solar-protection glazing with satisfactory mechanical and chemical durability, but is not truly "bendable" or "tempertemperable" since the oxide layers surrounding the functional layer do not prevent it from being oxidized during the bending or tempertempering operation, the oxidation of the functional layer being accompanied by a modification in the light transmission in the visible range and in the general appearance of the glazing in its entirety.

Many studies have been carried out recently to make the layers bendable/tempertemperable within the field of low-emissivity glazing, in which the aim is rather to achieve high light transmission, unlike the glazing known as "solar-protection" glazing. It has already been proposed to use, above the silver functional layers, dielectric layers based on silicon nitride, this material being relatively inert with respect to high-temperature oxidation and proving suitable for protecting the subjacent silver layer, as described in Patent EP-0 718 250.

Other stacks of layers acting on solar radiation and assumed to be bendable/tempertemperable have been described, these employing functional layers other than silver: Patent EP-0 536 607 uses functional layers made of a metal nitride, of the TiN or CrN type, with protective layers made of metal or of silicon derivatives. Patent EP-0 747 329 describes functional layers made of a nickel alloy of the NiCr type which are combined with silicon nitride layers.

However, the performance of these stacks providing a solar-protection function is still capable of improvement, especially in terms of durability and of resistance to degradation when subjected to a high-temperature heat treatment.

The term "functional" layer is understood to mean in the present application the layer(s) in the stack which gives the stack most of its thermal properties, as opposed to the other layers, generally made of dielectric material, having as function that of chemically or mechanically protecting the functional layers, an optical function, an adhesion layer function, etc.

In one particular variant, said thin-film stack has at least one metallic functional layer based on stainless steel.

In one particular variant, said thin-film stack comprises at least one nitrided functional layer, especially based on silicon nitride or titanium nitride, as known from International Patent Application No. WO 01/21540.

In another particular variant, said thin-film stack comprises at least one metallic functional layer based on silver or on a metal alloy containing silver, and two antireflection coatings, said coatings each comprising at least one dielectric layer, said functional layer being placed between the two antireflection coatings, the functional layer optionally being deposited directly onto an underblocker coating placed between the functional layer and the subjacent antireflection coating, and the functional layer optionally being deposited directly beneath an overblocker coating placed between the functional layer and the superjacent antireflection coating.

This known type of stack to which the invention relates is called an "underblocker/overblocker stack" as it has, in particular, the following structure, in this order:

substrate/subjacent antireflection coating/underblocker coating/metallic functional layer/overblocker coating/superjacent antireflection coating+optionally a protection layer.

The functional layer is thus placed between two antireflection coatings, each in general comprising a single layer which is made of a dielectric material of the silicon nitride type. The object of these coatings that flank the metallic functional layer is to "antireflect" this metallic functional layer.

However, a blocker coating is interposed between each antireflection coating and the metallic functional layer.

The blocker coating placed beneath the functional layer in the direction of the substrate promotes the crystalline growth of this layer and protects it during an optional high-temperature heat treatment of the bending and/or tempertempering type.

The blocker coating placed on the functional layer on the opposite side from the substrate protects this layer from any degradation during the deposition of the upper antireflection coating and during an optional high-temperature heat treatment of the bending and/or tempertempering type.

It is furthermore possible that the face of the substrate that is opposite the main face also has a texture in relief having a depth of at least 1 mm, this opposite face optionally being provided with a thin-film stack having reflection properties in the infrared and/or in solar radiation and/or having antireflection properties.

The aim of the present invention is more precisely to provide a stack of the type of those presented above that has a high resistance to the bending and/or tempertempering heat treatment applied to glass substrates in order to allow them to be bent and/or tempertempered.

A person skilled in the art makes a distinction between two categories of stacks resistant to bending and/or tempertempering heat treatment (or withstanding a heat treatment):

1—stacks referred to as those "to be tempertempered" which do not have the desired and expected characteristics before the heat treatment, in particular those of light transmission, color, resistivity, etc., and which acquire them during this heat treatment; the substrates coated with this type of stack cannot therefore be used as such by the end user (when conditioning the substrates in order to form glazing units, for example), but only after having undergone a heat treatment; and 2—stacks referred to as those that are "bendable" and/or "tempertemperable", which have acceptable characteristics before the heat treatment and have, after the heat treatment, similar or almost identical characteristics, that is to say which have changes in characteristics due to the heat treatment that are acceptable and such that it will be difficult for an observer to distinguish, by visual observation, substrates coated with the stack that have undergone a heat treatment from substrates coated with the same stack that have not undergone heat treatment.

It is not possible for a person skilled in the art to define these two categories more precisely since, for example, a stack "to be tempertempered" may have as low a change in light transmission in the visible range due to the heat treatment as a "tempertemperable" stack but may, for example, have a greater change in light reflection in the visible range or a greater change in color.

However, the documents of the prior art and the technical documentation of glass manufacturers clearly make this distinction.

The invention thus applies to what are called "tempertemperable" substrates insofar as it is difficult to distinguish, on one and the same building wall for example having close to one another, on the one hand, glazing units integrating substrates according to the invention having a thin-film stack and which have been tempertempered after the deposition of the layers and, on the other hand, substrates according to the invention with the same thin-film stack that are not tempertempered, by a simple overall visual observation of the glazing units integrating in particular the light transmission in the visible range, the color in reflection and the light reflection in the visible range of the glazing.

For a person skilled in the art, there are stacks that do not withstand any heat treatment.

Thus, European Patent Application EP 567 735 discloses a stack of the abovementioned type having a functional silver-based layer which cannot undergo a heat treatment.

In that document EP 567 735 it is explained that it is important for each nickel-based blocker coating to have a thickness of less than 0.7 nanometers.

European Patent Application EP 646 551 also discloses a stack of the same type (same succession of layers, and the same material for each layer) which itself can undergo a heat treatment; this is a stack "to be tempertempered" as it has significant changes, in particular optical changes, during the bending or tempertempering heat treatment.

Document EP 646 551 explains that the solution of the previous document (EP 567 735) cannot undergo a heat treatment, probably because the thickness of each blocker coating is insufficient to correctly protect the silver-based metallic functional layer.

Document EP 646 551 thus indirectly recommends, in order to produce a stack of the same type but which withstands the heat treatment, that the underblocker coating be much thicker (preferably 2 to 4 times the thickness of the overblocker coating) and in particular it explains that it is preferable for this underblocker coating to have a thickness greater than 2 nm and advises a thickness of about 4.5 nm.

The term "glass substrate" used here denotes any type of substrate customarily used in the glass industry for producing glazing and thus covers all glass substrates, whatever their thickness, and all polymer substrates, whatever their thickness (and in particular all common plastics; polycarbonate (PC), polyvinyl butyral (PVB), polyethylene terephthalate (PET), etc.).

The glazing according to the invention incorporates at least the substrate bearing the stack according to the invention, optionally combined with at least one other substrate. Each substrate may be clear or tinted. At least one of the substrates may especially be made of bulk-tinted or surface-tinted glass. The choice of coloration type will depend on the level of light transmission and/or on the colorimetric appearance that is/are desired for the glazing once its manufacture has been completed.

In this glazing unit, assembled as monolithic glazing or as multiple glazing of the double-glazing or laminated-glazing type, at least the substrate bearing the stack may be curved and/or tempertempered, the heat treatment possibly being carried out either before or after the deposition of the thin-film stack.

The glazing according to the invention may thus have a laminated structure, especially one combining at least two rigid substrates of the glass type with at least one sheet of thermoplastic polymer, so as to have a structure of the type: glass/thin-film stack/sheet(s)/glass. The polymer may especially be based on polyvinyl butyral (PVB), ethylene/vinyl acetate (EVA), polyethylene terephthalate (PET) or polyvinyl chloride (PVC).

The glazing may also have what is called an asymmetric laminated glazing structure, which combines a rigid substrate of the glass type with at least one sheet of polymer of the polyurethane type having energy-absorbing properties, optionally combined with another layer of polymers having "self-healing" properties. For further details about this type of glazing, the reader may refer especially to Patents EP-0 132 198, EP-0 131 523 and EP-0 389 354.

The glazing may then have a structure of the type: glass/thin-film stack/polymer sheet(s).

When the main coated surface of the stack is thus covered with a polymer sheet, the thin-film stack, although divided up by the textured structure of the surface on which it is deposited, is then protected from any degradation by this polymer sheet. Moreover, this sheet makes it possible to compensate for the differences in the surface at the periphery of the glazing for easier integration into a frame having a substrate-receiving surface that is smooth.

The glazing according to the invention is capable of undergoing a heat treatment without damaging the thin-film stack. The glazing is therefore possibly curved and/or tempertempered.

The glazing may be curved and/or tempertempered when consisting of a single substrate, the one provided with the stack. Such glazing is then referred to as "monolithic" glazing. When it is curved, the thin-film stack preferably is on an at least partly non-planar face.

The glazing may also be a multiple glazing unit, especially a double-glazing unit, at least the substrate bearing the stack possibly being curved and/or tempertempered. It is preferable in a multiple glazing configuration for the stack to be placed so as to face the intermediate gas-filled space. In a laminated structure, the substrate bearing the stack may be in contact with the sheet of polymer.

When the glazing is monolithic or is in the form of multiple glazing of the double-glazing or laminated-glazing type, at least the substrate bearing the stack may be made of curved or tempertempered glass, it being possible for this substrate to be curved or tempertempered before or after the stack has been deposited.

The invention also relates to a process for manufacturing substrates according to the invention, which consists in depositing the thin-film stack on its substrate by a vacuum technique of the sputtering, optionally magnetron sputtering, type.

However, it is not excluded for the first layer or the first layers of the stack to be able to be deposited by another technique, for example by a thermal decomposition technique of the pyrolysis type.

The invention also relates to a process for manufacturing a glass substrate according to the invention having a main face that exhibits a texture in relief having a depth of at least 1 mm.

This process is noteworthy in that said main face is provided with a thin-film stack having reflection properties in the infrared and/or in solar radiation.

Said thin-film stack may be deposited after the formation of the texture in relief, especially by a vacuum deposition technique, in particular by magnetron sputtering.

However, the formation of the texture in relief may also be carried out after the deposition of said thin-film stack, especially when the formation of the texture in relief is carried out at high temperature and is completed by a bending and/or a tempering of the substrate.

The invention also relates to the use of a thin-film stack having reflection properties in the infrared and/or in solar radiation on a main face of a glass substrate in order to produce a substrate according to the invention, the main face of which exhibiting a texture in relief having a depth of at least 1 mm, or in order to produce a glazing unit according to the invention.

In the context of this use, the thin-film stack is preferably an architectural thin-film stack, especially a thin-film stack for architectural glazing that is "temperable" or "to be tempered", and in particular a solar control stack, especially that is "temperable" or "to be tempered".

Advantageously, it appears, surprisingly, that a thin-film stack having reflection properties in the infrared and/or in solar radiation makes it possible to increase the impression of depth of the texture.

An optical interaction probably takes place between the various surface portions coated with the stack which, due to the light reflection properties of the stacks, give the impression that the texture is more pronounced, that is to say hollower or more prominent, than it actually is.

Thus, for one and the same general texture, the depth of the features appears increased by 20 to 50% when two textured substrates are compared, one without a thin-film stack and the other according to the invention with a thin-film stack on the textured face.

Figure 2:
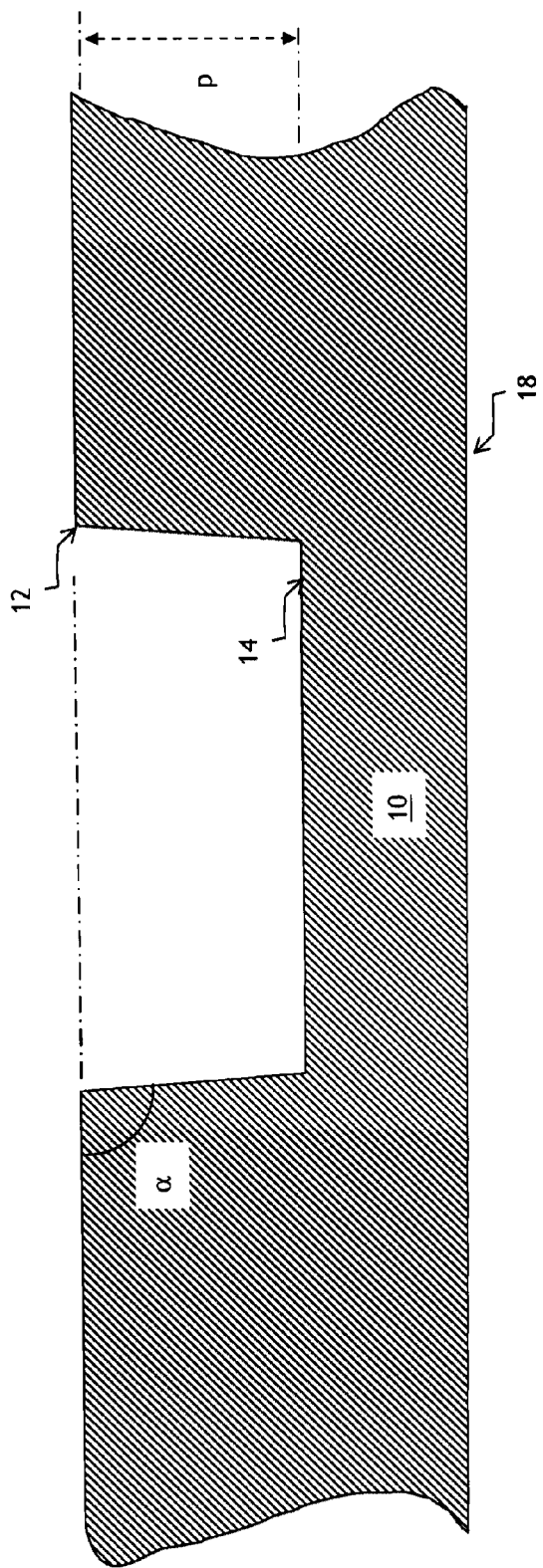
FIG. 2 illustrates a textured substrate according to the invention before the deposition of the thin-film stack.
Figure 3:
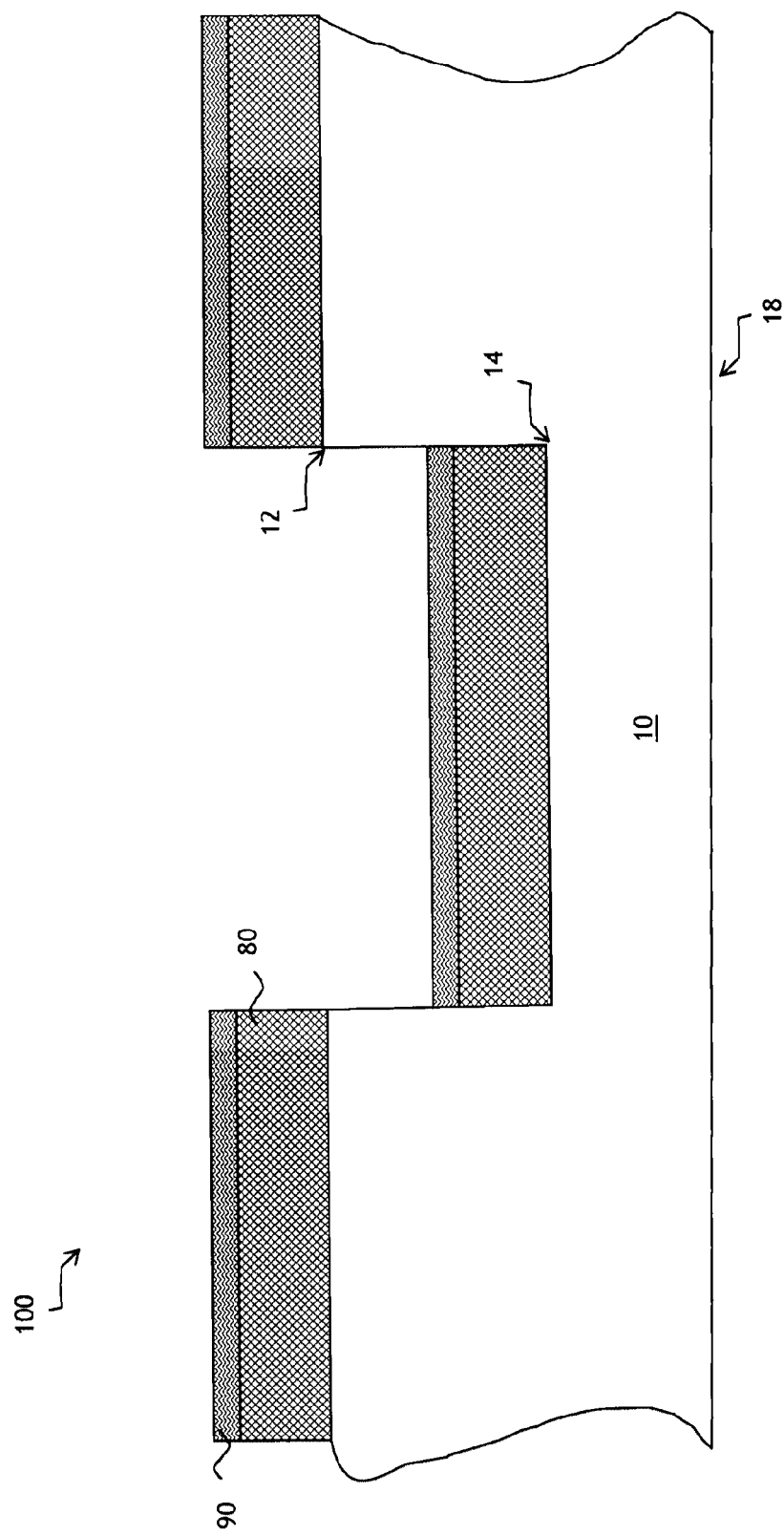
FIG. 3 illustrates a substrate according to the invention coated with a functional single-layer stack based on stainless steel.
Figure 4:
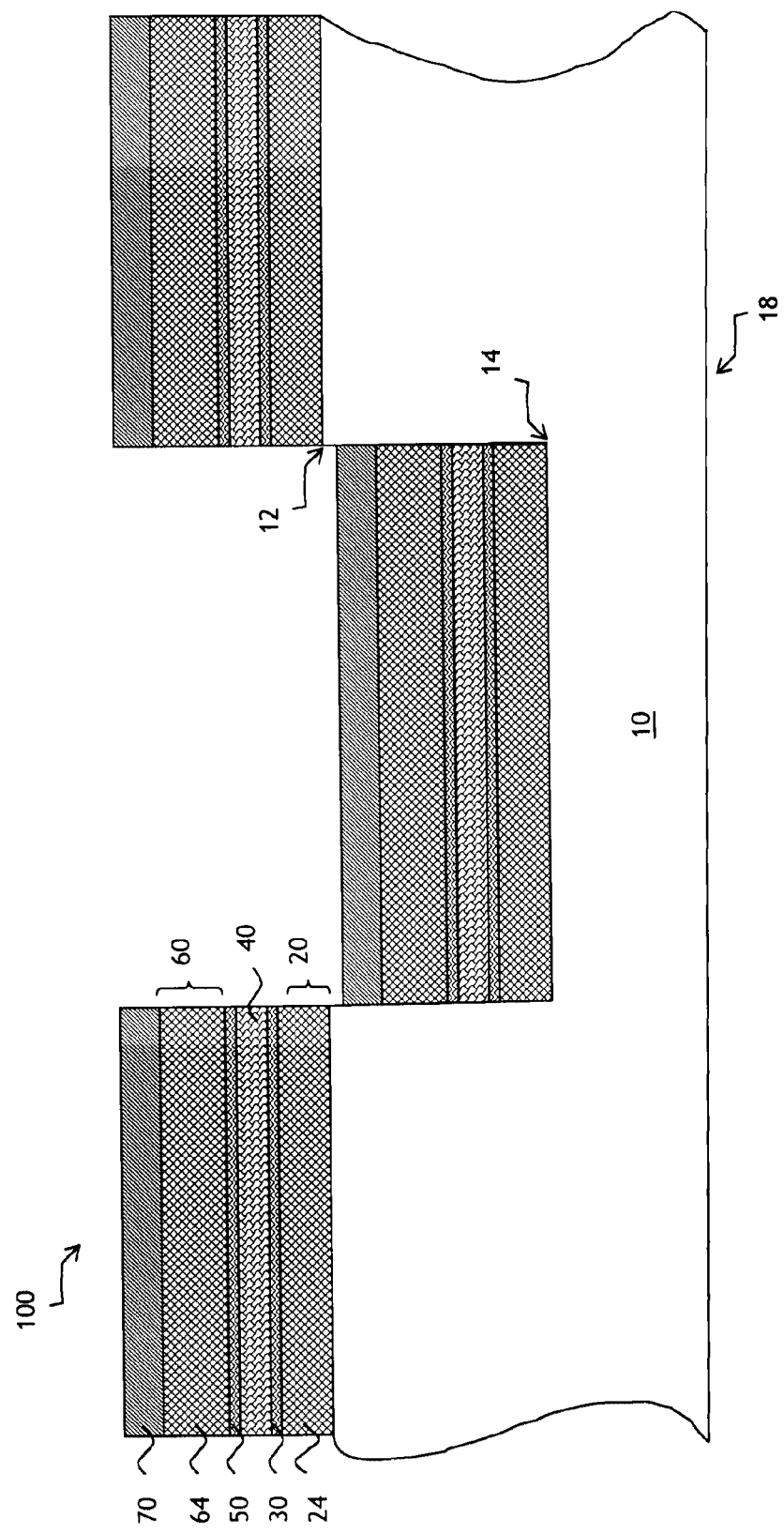
FIG. 4 illustrates a substrate according to the invention coated with a functional, silver-based, single-layer stack, the functional layer being provided with an underblocker coating and with an overblocker coating and the stack being furthermore provided with an optional protection coating.

The details and advantageous features of the invention will emerge from the following non-limiting examples, illustrated by means of the appended figures:

FIG. 1 schematically illustrates a rolling process in which rolling rolls are used that also act as texturing means, in the sense of the present invention;

FIG. 2 illustrates a textured substrate according to the invention before the deposition of the thin-film stack;

FIG. 3 illustrates a substrate according to the invention coated with a functional single-layer stack based on stainless steel; and FIG. 4 illustrates a substrate according to the invention coated with a functional, silver-based, single-layer stack, the functional layer being provided with an underblocker coating and with an overblocker coating and the stack being furthermore provided with an optional protection coating.

In the figures, the thicknesses of the various materials or elements have not been drawn in proportion so as to make them easier to examine.

The method conventionally used for the manufacture of textured, large-sized glass substrates consists of a rolling process, the principle of which is illustrated in FIG. 1, in which the molten glass 1, drawn over a refractory 2 in the direction of the double-line arrow, is shaped by passing through metal rolls 3 and 4. The glass has a temperature of around 1200° C. before shaping and of about 850° C. on exiting the rolling machine. When it is desired to impress a feature or a texture into the glass, one conventional technique consists in using a roll, such as for example the roll 3, which is not smooth on its surface but that has at its surface the negative of the feature or of the texture that it is desired to obtain on the substrate. These texturing techniques are especially known in the field of decorated glass or else in the field of photovoltaic devices, for example in European Patent Application No. EP 1774372. Equally, the rolls may be etched on the upper and/or lower face. In a well-known manner, the glass is then drawn and sent to a lehr.

In one conventional model of a roll, there is a constant spacing between two texturing features. These texturing features are composed, for example, of a set of reliefs or protuberances, for example of prismatic shape, present at the surface of the roll and parallel to each another. The reliefs typically make it possible to obtain, on the main face of the substrate, a texture that has a positive repetition of the roll feature.

It is possible to achieve thermoforming simply by gravity on a textured form.

The texturing of the substrate according to the invention may thus be produced by rolling (or casting), thermoforming, etching, especially laser etching for a polymer material.

The manufacturing process according to the invention thus consists, for a glass substrate 10 illustrated in FIG. 2 having a main face that exhibits a texture in relief having a depth p of at least 1 mm, in providing said main face of a thin-film stack 100 having reflection properties in the infrared and/or in solar radiation in order to obtain a substrate illustrated in FIG. 3 or 4.

Either the thin-film stack 100 is deposited after the formation of the texture in relief, especially by a vacuum deposition technique, in particular by magnetron sputtering, or the formation of the texture in relief is carried out after the deposition of said thin-film stack 100 at high temperature and is optionally completed by a bending and/or a tempering of the substrate.

The substrate 10 illustrated in FIG. 2 exhibits a texture in relief having a depth p between 1 and 15 mm, in particular between 2 and 12 mm. This depth corresponds to the distance measured between a reference surface 12 of the main face and a bottom surface 14 of the relief of the main face, which is furthest away from the main surface.

The substrate 10 has another face, the opposite face 18, the reference surface 12 is here the surface furthest away from this opposite face, whilst the bottom surface 14 is the surface closest to the opposite face 18 due to the fact that the relief is considered to be a hollow.

The slope of the relief located between a reference surface 12 of the main face and a bottom surface 14 of the relief is oriented at an angle $\alpha$ between 90° and 120°.

To the texture provided by the features on one side of the substrate (main face), it is also possible to add, to the other side (opposite face, 18), a texture provided by a roughness of this opposite face or by a rough layer. This rough layer may, for example, be a transparent conductive layer based on metal oxide(s), said surface or said layer having an RMS roughness of at least 3 nm, in particular of at least 5 nm and/or an average size of the features of this roughness of at least 50 nm.

RMS roughness stands for "Root Mean Square" roughness. This is a measurement that consists in measuring the value of the root mean square of the roughness. This RMS roughness therefore quantifies, in concrete terms, the mean height of the roughness peaks relative to a mean height.

Two examples have been carried out using, as the base substrate, a substrate sold by SAINT-GOBAIN under the name CREA-LITE®, having a thickness of 20 mm and having a difference in level of around 8 mm in depth over a maximum distance of 8 mm.

An example 1 was carried out in which the thin-film stack 100 had a metallic functional layer 80 made of stainless steel coated with a protective layer 90 made of titanium nitride.

The light transmission in the visible range was around 1%, the light reflection on the main face side was around 40% and the light reflection on the opposite face side 18 was around 50%.

The light transmission in the visible range for this example 1 was very low, but it was however sufficient for the targeted applications, especially for decoration applications.

An example 2 was carried out in which the thin-film stack 100 had a metallic functional layer 40 based on silver, and two antireflection coatings 20, 60, said coatings each comprising at least one dielectric layer 24, 64, said functional layer 40 being placed between the two antireflection coatings 20, 60, the functional layer 40 being deposited directly onto an underblocker coating 30 placed between the functional layer 40 and the subjacent antireflection coating 20, and the functional layer 40 being deposited directly beneath an overblocker coating 50 placed between the functional layer 40 and the superjacent antireflection coating 60.

Table 1 below illustrates the physical thicknesses (and not the optical thicknesses) in nanometers of each of the layers of example 2:

TABLE 1

| Layer | Material | Ex. 2 |
| --- | --- | --- |
| 70 | TiO$_x$ | 2 |
| 64 | Si$_3$N$_4$ | 45 |
| 50 | NiCr | 0.8 |
| 40 | Ag | 5.5 |
| 30 | NiCr | 0.8 |
| 24 | Si$_3$N$_4$ | 45 |

The optical and surface resistance characteristics of this example were:

T$_{Lvis}$, light transmission T$_L$ in the visible range in %, measured under illuminant D65: 64%;

R$_{Lvisc}$, light reflection R$_L$ in the visible range in %, measured on the layer side under illuminant D65: 12%;

sheet resistance around 16Ω/□.

The stack from example 2 is a temperable stack within the meaning of the invention since the variation in light transmission in the visible range ΔT$_{Lvis}$ of the coated substrate is less than 5.

It is therefore difficult to distinguish substrates according to one of the examples 2 having undergone a heat treatment from substrates respectively of this same example that have not undergone a heat treatment, when they are placed side by side.

The present invention is described in the aforegoing by way of example. It is understood that a person skilled in the art is able to produce various variants of the invention without however going outside the scope of the patent as defined by the claims.

The invention claimed is:

1. A glass substrate having a main face that exhibits a texture in relief having a depth of at least 1 mm, the texture in relief extending from a reference surface of the main face and a bottom surface of the relief, wherein the entire surface of the reference surface of the main face and the bottom surface of the relief comprises a thin-film stack having reflection properties in the infrared and/or in solar radiation.

2. The substrate as claimed in claim 1, wherein the relief has a depth between 1 and 15 mm.

3. The substrate as claimed in claim 1, wherein at least 20% of the reference surface of the main face is located in one and the same plane.

4. The substrate as claimed in claim 1, wherein at least 20% of the bottom surface of the relief of the main face that is not the reference surface is located in one and the same plane.

5. The substrate as claimed in claim 1, wherein the slope of the relief located between the reference surface of the main face and the bottom surface of the relief is oriented at an angle α between 90° and 120°.

6. The substrate as claimed in claim 1, wherein said thin-film stack comprises at least one metallic functional layer comprising silver or a metal alloy comprising silver, and two antireflection coatings, said coatings each comprising at least one dielectric layer, said functional layer being placed between the two antireflection coatings, the functional layer optionally being deposited directly onto an underblocker coating placed between the functional layer and the subjacent antireflection coating, and the functional layer optionally being deposited directly beneath an overblocker coating placed between the functional layer and the superjacent antireflection coating.

7. The substrate as claimed in claim 1, wherein said thin-film stack comprises at least one nitrided functional layer comprising silicon nitride and/or titanium nitride.

8. The substrate as claimed in claim 1, wherein the opposite face of the substrate, that which is opposite the main face, exhibits a texture in relief having a depth of at least 1 mm, this opposite face optionally being provided with a thin-film stack having reflection properties in the infrared and/or in solar radiation and/or having antireflection properties.

9. A glazing unit incorporating at least one substrate as claimed in claim 1, optionally combined with at least one other substrate.

10. The glazing unit as claimed in claim 9, assembled as monolithic glazing or as multiple glazing being double-glazing or laminated-glazing, wherein at least the substrate bearing the stack is curved and/or tempered.

11. A process for manufacturing a glass substrate as claimed in claim 1, comprising a main face that exhibits a texture in relief having a depth of at least 1 mm, wherein said main face is provided with a thin-film stack having reflection properties in the infrared and/or in solar radiation.

12. The process as claimed in claim 11, wherein said thin-film stack is deposited after the formation of the texture in relief.

13. The process as claimed in claim 11, wherein the formation of the texture in relief is carried out after providing said thin-film stack.

14. The process as claimed in claim 13, wherein the formation of the texture in relief is carried out at high temperature and is completed by a bending and/or a tempertempering of the substrate.

15. The process of claim 12, wherein the thin-film stack is deposited by vacuum deposition.

16. The process of claim 12, wherein the thin-film stack is deposited by magnetron sputtering.

17. The substrate as claimed in claim 1, wherein the relief has a depth between 2 and 12 mm.

* * * * *